(12) United States Patent
Kurokawa et al.

(10) Patent No.: US 6,999,396 B2
(45) Date of Patent: Feb. 14, 2006

(54) INITIALIZATION METHOD OF OPTICAL RECORDING MEDIUM

(75) Inventors: Kotaro Kurokawa, Kanagawa (JP); Takeshi Yamasaki, Kanagawa (JP); Daisuke Ueda, Tokyo (JP); Shigeki Takagawa, Kanagawa (JP); Masanobu Yamamoto, Kanagawa (JP)

(73) Assignee: Sony Corporation, Tokyo (JP)

(*) Notice: Subject to any disclaimer, the term of this patent is extended or adjusted under 35 U.S.C. 154(b) by 184 days.

(21) Appl. No.: 10/474,085

(22) PCT Filed: Feb. 7, 2003

(86) PCT No.: PCT/JP03/01292

§ 371 (c)(1),
(2), (4) Date: Mar. 15, 2004

(87) PCT Pub. No.: WO03/067582

PCT Pub. Date: Aug. 14, 2003

(65) Prior Publication Data

US 2004/0145999 A1    Jul. 29, 2004

(30) Foreign Application Priority Data

Feb. 8, 2002 (JP) .............................. 2002-032393

(51) Int. Cl.
*G11B 7/00* (2006.01)
(52) U.S. Cl. ........................ 369/100; 369/94; 369/275.2
(58) Field of Classification Search ............... None
See application file for complete search history.

(56) References Cited

U.S. PATENT DOCUMENTS 5,688,574 A * 11/1997 Tamura et al. .............. 369/288
6,009,070 A    12/1999 Higuchi et al.

(Continued)

FOREIGN PATENT DOCUMENTS

| EP | 1 118 988 A1 | 7/2001 |
|----|----|----|
| JP | 09-293270 A | 11/1997 |

(Continued)

*Primary Examiner*—Thang V. Tran
(74) *Attorney, Agent, or Firm*—Robert J. Depke; Trexler, Bushnell, Giangiorgi, Blackstone & Marr, Ltd.

(57) ABSTRACT

An initialization method of an optical recording medium having a plurality of optical recording layers capable of reducing initialization unevenness due to light interference caused at the time of initialization without deteriorating information recording/reproducing signal characteristics of the optical recording layers is provided. An initialization method of an optical recording medium, wherein a second optical recording layer and a first optical recording layer are stacked via an interlayer on a substrate in an order, a protective layer is formed further on the first optical recording layer, a recording film in the first optical recording layer comprises a phase change type recording material, and a recording/reproducing light is irradiated from the protective film side at the time of recording/reproducing, and in a step of initializing by irradiating an initializing light on the first optical recording layer from the protective film side, the first optical recording layer is initialized so that an energy density ID1 per unit area of an incident light of the initializing light at respective points in a light convergence region converged on the first optical recording layer and an energy density ID2 per unit area at the respective points of the light convergence region of a return light, which is the initializing light transmitted through the first optical recording layer to reach the second optical recording layer, reflected on the second optical recording layer and again returned to the first optical recording layer, satisfy $ID2/ID1 \leq 0.002$.

4 Claims, 19 Drawing Sheets

U.S. PATENT DOCUMENTS

| | | | |
|---|---|---|---|
| 6,456,584 B1 * | 9/2002 | Nagata et al. | 369/275.2 |
| 6,574,180 B2 * | 6/2003 | Kurokawa et al. | 369/94 |
| 6,807,142 B1 * | 10/2004 | Nagata et al. | 369/275.2 |
| 2002/0018428 A1 | 2/2002 | Kurokawa et al. | |
| 2003/0012115 A1 * | 1/2003 | Akiyama et al. | 369/275.2 |

FOREIGN PATENT DOCUMENTS

| | | |
|---|---|---|
| JP | 11126370 A | 5/1999 |
| JP | 2000-113513 A | 4/2000 |
| JP | 2001-250265 A | 9/2001 |
| WO | WO01/04888 A1 | 1/2001 |

* cited by examiner

INITIALIZATION METHOD OF OPTICAL RECORDING MEDIUM

This application claims priority to Japanese Patent Application Number JP2002-032393, filed Feb. 8, 2002, which is incorporated herein by reference.

TECHNICAL FIELD

The present invention relates to an initialization method of an optical recording medium (hereinafter, also referred to as an optical disk), and particularly relates to an initialization method of a multilayer optical disk having optical recording layers using a phase change type material as a recording material.

BACKGROUND ART

In recent years, in the field of information recording, studies on optical information recording methods has been pursued in various places. Such optical information recording methods have advantages of being able to record and reproduce in a noncontact way and deal with the read-only type, the write-once-read-many type and the rewritable type memory forms and are expected to be widely used as methods capable of realizing an inexpensive large-capacity file.

A large capacity of an optical recording medium for a variety of optical information recording forms (hereinafter, also referred to as an optical disk) has been attained by shortening the wavelength of the laser light being light source used in the optical information recording method and adopting an objective lens having a high numerical aperture to make a spot size on a focal surface small.

For example, in a Compact Disk (CD), the laser light wavelength is 780 nm, the numerical aperture (NA) of an objective lens is 0.45, and the capacity is 650 MB, while in a Digital Versatile Disk Read-Only Memory (DVD-ROM), the laser light wavelength is 650 nm, the NA is 0.6 and the capacity is 4.7 GB.

Furthermore, in an optical disk system of the next generation, attaining of a large capacity has been studied by using an optical disk formed with a thin light transmitting protective film (a cover film) of, for example, 100 μm or so on an optical recording layer, irradiating a laser light for recording/reproducing from the protective film side, making a laser light wavelength to be 450 nm or less, and making the numerical aperture (NA) of an objective lens to be 0.78 or more.

Also, in recent years, development of a rewritable type multilayer optical disk having two optical recording layers by using a phase change type recording material has been pursued. Hereinafter, an optical disk having a plurality of optical recording layers will be also called as a multilayer optical disk, and an optical disk having one optical recording layer will be called as a single layer optical disk, respectively.

The present inventors has engaged in development of a phase change type multilayer optical disk and presented at the Optical Data Storage (ODS) Symposium in 1999 and 2001.

A phase change optical disk, regardless of a single layer optical disk or a multilayer optical disk, requires a process called initialization before shipping to the market.

In a production process of a phase change type optical disk, generally, a film of a phase change type recording material is formed on a substrate made of polycarbonate, etc. by a sputtering apparatus, and in a stage after forming the film called "as-deposited", a phase state of the phase change type recording material is close to an amorphous state.

In a phase change optical disk, when recording information, the state of the phase change type recording material is required to be the crystalline state. The process of changing the amorphous state right after forming the film to the crystalline state is called as the "initialization process".

In a currently widely used initialization apparatus, crystallization of an overall optical recording layer is performed by converging a laser light on the optical recording layer to be initialized to heat the phase change type recording material and scanning allover the optical recording layer.

At this time, a beam shape of the laser light converged on the optical recording layer has a beam width of, for example, about 1 μm in the disk rotation direction and about 100 μm in the radius direction.

When initializing the optical recording layer on the multilayer optical disk having a phase change type optical recording layer provided as the first layer from the light incident side by using such an initialization apparatus, as described in the Japanese laid open patent publication No. 2001-250265, it is known that due to light interference generated by unevenness of a thickness of an interlayer between a first optical recording layer and a second optical recording layer, a light intensity change of an initializing light occurs on the first recording layer and causes initialization unevenness.

DISCLOSURE OF THE INVENTION

The present invention was made in consideration with the above circumstances. Accordingly, an object of the present invention is to provide an initialization method of an optical recording medium capable of reducing initialization unevenness due to light interference generated at the time of initialization without deteriorating information recording/reproducing signal characteristics of respective recording layers.

To attain the above object, an initialization method of an optical recording medium according to the present invention is an initialization method of an optical recording medium, wherein a second optical recording layer and a first optical recording layer are stacked via an interlayer on a substrate in an order, a protective layer is formed further on the first optical recording layer, a recording film in the first optical recording layer comprises a phase change type recording material, and a recording/reproducing light is irradiated from the protective film side at the time of recording/reproducing; and in a step of initializing by irradiating an initializing light on the first optical recording layer from the protective film side, the first optical recording layer is initialized so that an energy density ID1 per unit area of an incident light of the initializing light at respective points in a light convergence region on the first optical recording layer and an energy density ID2 per unit area at the respective points of the light convergence region of a return light, which is the initializing light transmitted through the first optical recording layer to reach the second optical recording layer, reflected on the second optical recording layer and again returned to the first optical recording layer, satisfy a formula (1) below.

$$ID2/ID1 \leq 0.002 \tag{1}$$

In the above initialization method of the optical recording medium of the present invention, preferably, a wavelength of the initializing light is a wavelength different from a wavelength of the recording/reproducing light; and the first optical recording layer includes a film being transparent to the recording/reproducing light and exhibiting absorption property to the initializing light.

Furthermore preferably, a wavelength of the initializing light is less than 400 nm; and a film being transparent to the recording/reproducing light and exhibiting absorption property to the initializing light contains ZnS—$SiO_2$ or ITO.

In the above initialization method of the optical recording medium of the present invention, in the step of initializing by irradiating an initializing light to the first optical recording layer, when converging a laser as the initializing light on the first optical recording layer to be initialized, a part of the initializing light irradiated on the optical recording layer to be initialized transmits through the first optical recording layer, reaches to the second optical recording layer, reflects on the second optical recording layer, returns back to the first optical recording layer and irradiates the first optical recording layer to be initialized.

Here, on the first optical recording layer, if an energy density of the return light can be made sufficiently small compared with that of an incident light on a region overlapped with the incident light of the initializing light and the return light from the second optical recording layer, the focused initialization unevenness due to light interference can be sufficiently reduced.

Namely, the initialization unevenness can be sufficiently reduced by initializing the first optical recording layer so as to satisfy the above formula (1) by the energy density ID1 per unit area of the initializing light at respective points in the light convergence region converged on the first optical recording layer and the energy density ID2 per unit area at the respective points in the light convergence region of the return light, which is the incident light of the initializing light transmitted through the first optical recording layer to reach the second optical recording layer, reflected on the second optical recording layer and again returned back to the first optical recording layer.

To decrease the energy density of the return light, it is sufficient if the light transmittance of the first optical recording layer is sufficiently small for the wavelength of the initializing light, or the reflectance of the second optical recording layer for the wavelength of the initializing light is sufficiently small. In the present invention, the former is applied.

A multilayer film composing a phase change type optical recording layer generally includes a recording film made by a phase change type recording material, a dielectric film transparent for the recording/reproducing wavelength and a film made by a metal reflection film.

In the present invention, for example, by introducing a dielectric material exhibiting absorption property to the wavelength of the initializing light, the light transmittance for the initializing wavelength of the first optical recording layer is reduced and preferable initialization can be realized.

BEST MODE FOR CARRYING OUT THE INVENTION

Below, embodiments of the present invention will be explained in detail by using the drawings.

The present embodiment relates to an initialization method of an optical recording medium (optical disk). The configuration and a production method of an optical disk will be briefly explained first, and then, the initialization method of the optical disk will be explained.

Figure 1A:
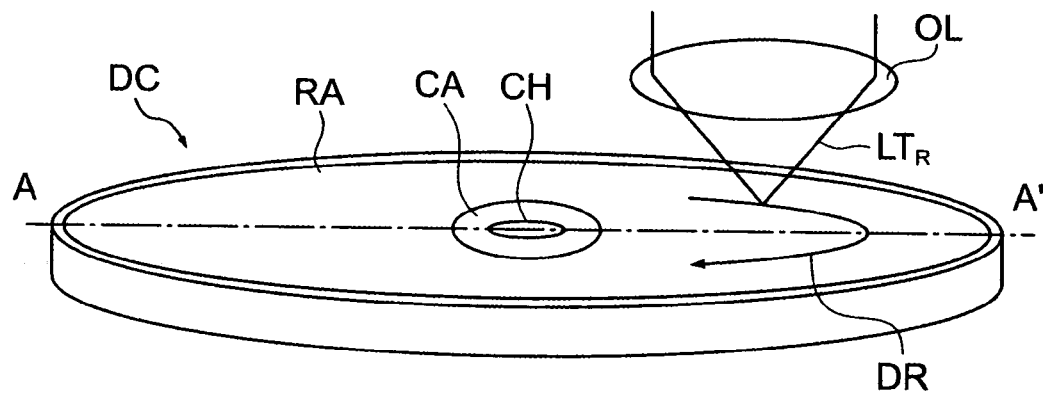
FIG. 1A is a schematic perspective view of a state of irradiating a light on an optical disk according to an embodiment of the present invention.

FIG. 1A is a schematic perspective view of a state of irradiating a light on an optical disk provided with two optical recording layers according to the present embodiment.

An optical disk DC has an approximate disk shape on which a center hole CH is opened at the center portion, an inner circumference portion is a clamp region CA and an outer side thereof is provided with an information recording/reproducing region RA, and rotates in the drive direction DR.

At the time of recording or reproducing information, an optical recording layer in the optical disk DC is irradiated by a laser light in a range of blue to blue-violet or other recording/reproducing light $LT_R$ from an objective lens OL, for example, having a numerical aperture of 0.8 or more.

Figure 1B:
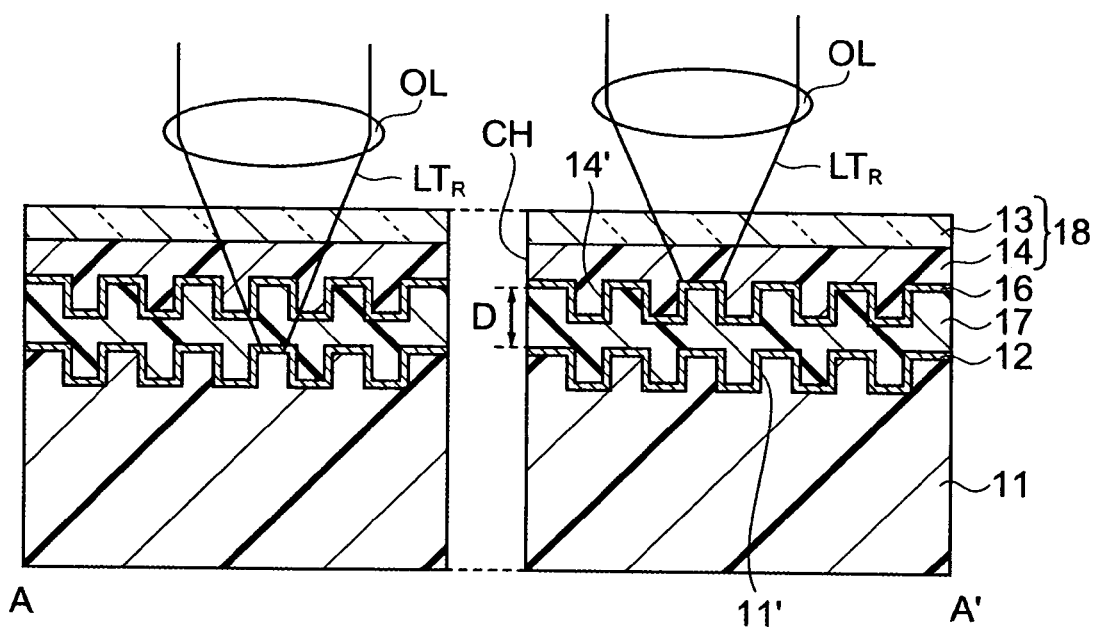
FIG. 1B is a schematic sectional view.

FIG. 1B is a schematic sectional view along the line A–A' in FIG. 1A.

A second optical recording layer 12 is formed on one surface of a disk substrate 11 made of polycarbonate, etc., for example, having a thickness of 1.1 mm, an outer diameter of 120 mm, an inner diameter of the center hole CH of 15 mm. On the other hand, a transfer layer 14 made of an ultraviolet curing resin is formed on one surface of a resin film 13, and a first optical recording layer 16 is formed on that surface. The first optical recording layer 16 and the second recording layer 12 are put together by an interlayer 17 which has a film thickness of, for example, 20 $\mu$m or so and is transparent to a wavelength of the recording/reproducing light. A light transmitting protective film 18 having a film thickness of, for example, 90 $\mu$m is composed by putting the transfer layer 14 and the resin film 13 together.

The second optical recording layer 12 and the first optical recording layer 16 each has the configuration of stacking a dielectric film, a recording film made by a phase change type recording material, etc., a dielectric film and reflection film, etc. in this order from the upper layer side, wherein at least a recording film of the first optical recording layer 16 is configured to include a phase change type recording material.

Here, one surface of the disk substrate 11 is provided with uneven shapes 11' and the second optical recording layer 12 is formed along the uneven shapes. Also, the surface of the transfer layer 14 is provided with uneven shapes 14', and the first optical recording layer 16 is formed along the uneven shapes. The first optical recording layer 16 and the second optical recording layer 12 have uneven shapes caused by the above uneven shapes 14' or the uneven shapes 11' and sectionalized to track regions, for example, called lands and grooves by the uneven shapes.

When recording or reproducing the above optical disk, as show in FIG. 1B, a laser light or other recording/reproducing light $LT_R$ is irradiated from the objective lens OL from the light transmitting protective film 18 side so as to focus on either one of the first optical recording layer 16 and the second optical recording layer 12. At the time of reproducing, a return light reflected on either one of the first and second optical recording layers (16 and 12) is received and a reproduction signal is taken out.

Also, by giving to the uneven shapes 11' a pit having a length corresponding to recording data and configuring the optical recording layer by a reflection film, such as an aluminum film, the second optical recording layer 12 can also be a read-only optical recording layer.

Next, an example of a production method of the above optical disk having two optical recording layers will be explained.

Here, an explanation will be made on the case where not only the first optical recording layer 16 but also the second optical recording layer 12 is configured to include a recording film made of a phase change type recording material.

First, a second optical recording layer stamper 10 having uneven shapes 10' on its surface which are patterns for the second optical recording layer is prepared by a conventionally well known predetermined method.

Figure 2A:
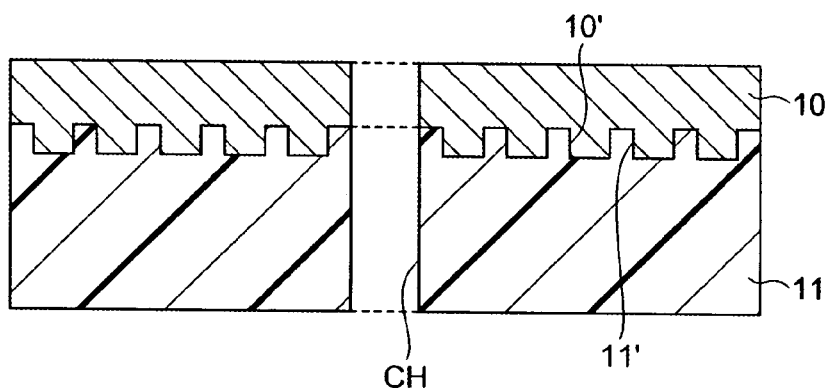
FIG. 2A and FIG. 2B are sectional views of a production process of a production method of the optical disk according to the embodiment.

Next, the above second optical recording layer stamper 10 is arranged so as to face inside a cavity of a mold and a disk substrate 11 made of polycarbonate is produced, for example, by injection molding for injecting melted polycarbonate as shown in FIG. 2A. At this time, a shape of the center hole CH is formed on the disk substrate 11 by setting a shape of the mold.

Here, on the surface of the disk substrate 11 is formed uneven shapes 11' corresponding to the uneven shapes 10' of the second optical recording layer stamper 10.

Figure 2B:
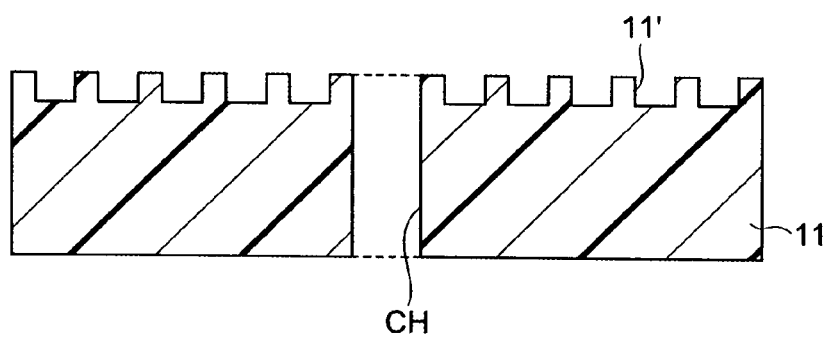

By releasing from the second optical recording layer stamper 10, a disk substrate 11 formed with the uneven shapes 11' on the surface as shown in FIG. 2B is obtained.

Figure 3A:
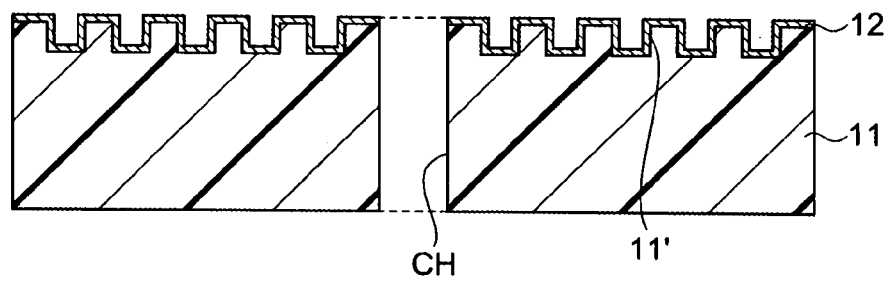
FIG. 3A and FIG. 3B are sectional views of a process continued from FIG. 2B.

Next, as shown in FIG. 3A, after removing dusts by blowing a gas, such as the air or a nitrogen gas, to the surface of the disk substrate 11, the second optical recording layer 12 is formed by successively stacking an total reflective reflection film made of an aluminum film, a dielectric film, a recording film of a phase change type recording material and a dielectric film, for example, by a sputtering method or the Chemical Vapor Deposition (CVD) method, etc.

Figure 3B:
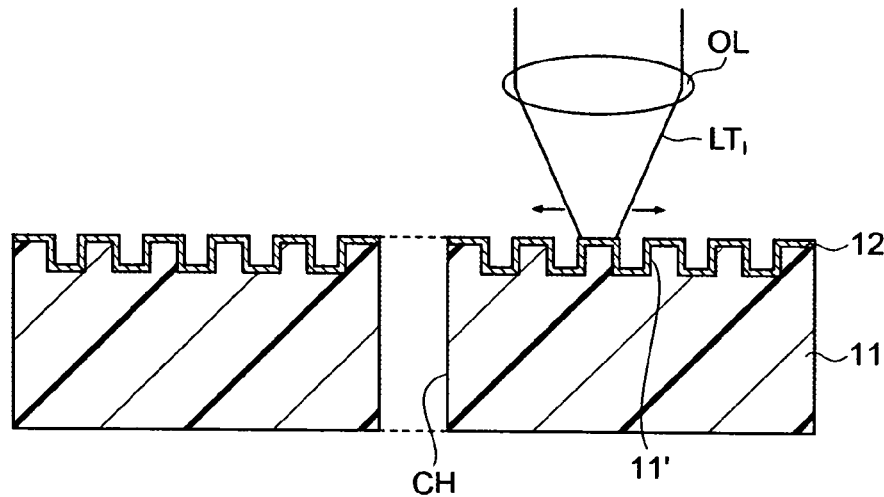

Next, to crystallize a phase change type recording material of the second optical recording layer 12 in a state close to amorphous in the stage after finishing the film forming called "as-deposited", as shown in FIG. 3B, the initializing light $LT_I$ is converged by the objective lens OL and irradiated on the second optical recording layer 12 to sweep allover the second optical recording layer 12, so that the second optical recording layer 12 is initialized.

As the initializing light $LT_I$, for example, an infrared laser or a laser having a wavelength of less than 400 nm, etc. may be used.

Figure 4A:
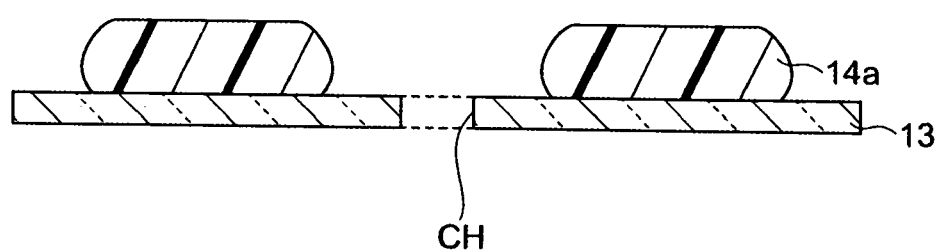
FIG. 4A and FIG. 4B are sectional views of a process continued from FIG. 3B.

On the other hand, as shown in FIG. 4A, a suitable amount of an ultraviolet curing resin 14a to be a transfer layer is supplied and spin coated on the approximately circular resin film 13, for example, having a thickness of 80 $\mu$m and a center hole CH at the center.

Figure 4B:
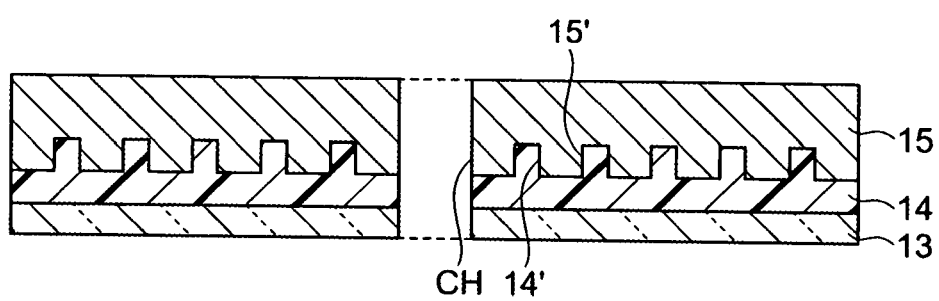

Next, a first optical recording layer stamper 15 having uneven shapes 15' on its surface which are patterns for the first optical recording layer is formed in advance, putting together the ultraviolet curing resin 14a and the first optical recording layer stamper 15 as show in FIG. 4B, and a sufficient amount of ultraviolet ray is irradiated to cure the ultraviolet curing resin 14a to obtain the transfer layer 14.

Here, uneven shapes 14' corresponding to the uneven shapes 15' of the first optical recording layer stamper 15 is formed on the surface of the transfer layer 14.

Figure 5A:
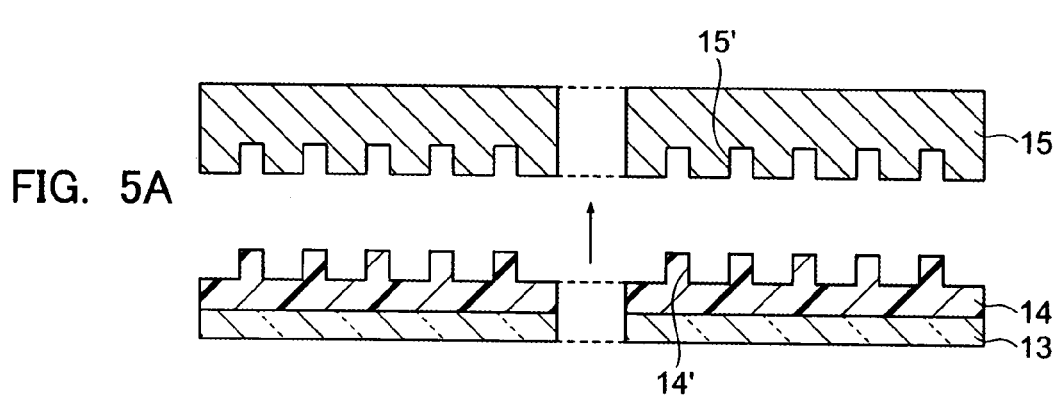
FIG. 5A and FIG. 5B are sectional views of a process continued from FIG. 4B.

Next, as shown in FIG. 5A, by removing on the boundary of the first optical recording layer stamper 15 and the transfer layer 14, the uneven shapes 14' is transferred on the surface of the transfer layer 14.

Figure 5B:
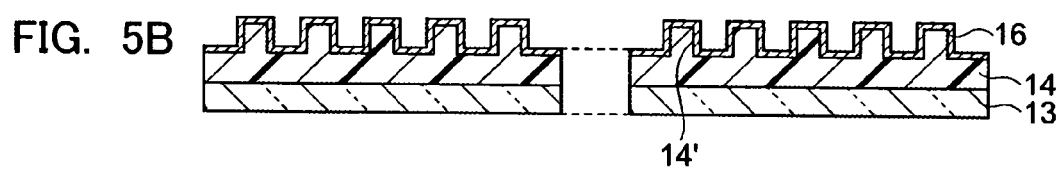

Next, as shown in FIG. 5B, after removing dusts by blowing a gas, such as the air or a nitrogen gas, to the surface of the transfer layer 14, the first optical recording layer 16 is formed by successively stacking a semi-transmitting reflection layer made of an aluminum film, a dielectric film, a recording film of a phase change type recording material and a dielectric film, for example, by a sputtering method or the CVD method, etc.

Figure 6A:
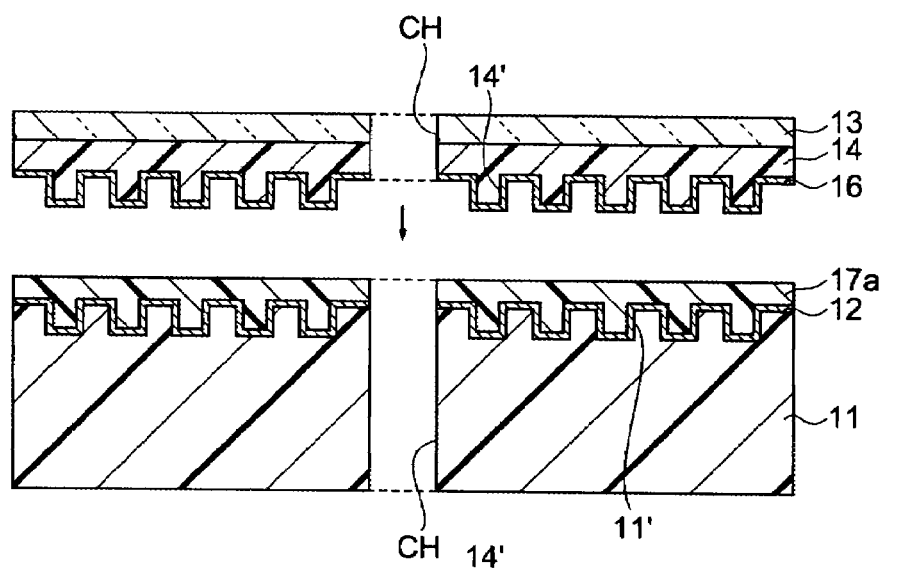
FIG. 6A and FIG. 6B are sectional views of a process continued from FIG. 5B.
Figure 6B:
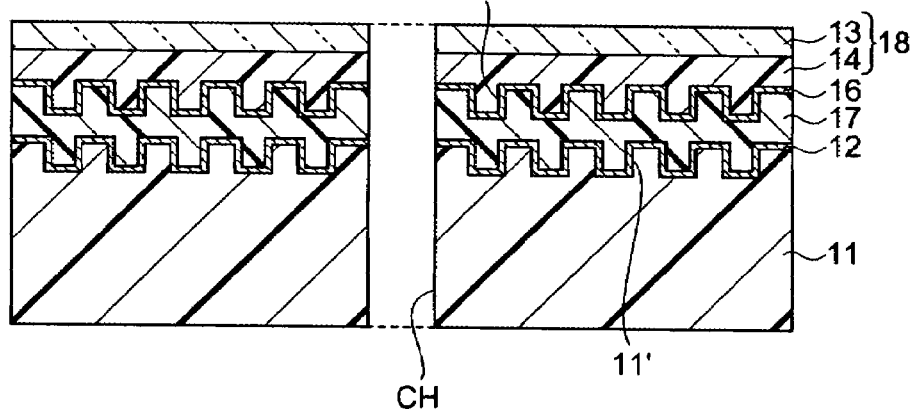

Next, as shown in FIG. 6A, a pressure sensitive adhesive sheet 17a is arranged on the second optical recording layer 12 formed on the disk substrate 11, and the second optical recording layer 12 and the first optical recording layer 16 are made to face to each other and aligned with their centers and adhered using the pressure sensitive adhesive sheet 17a as an interlayer 17 for adhering as show in FIG. 6B.

Figure 7:
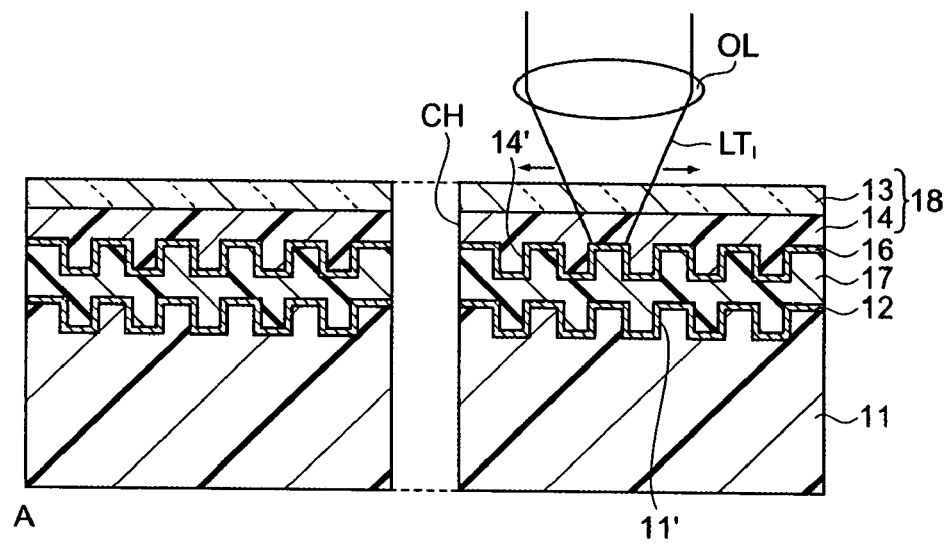
FIG. 7 is a sectional view of a process continued from FIG. 6B.

Next, in the same way as in the second optical recording layer 12, to crystallize a phase change type recording material of the first optical recording layer 16 in a state close to amorphous in the stage after finishing the film forming called "as-deposited", as shown in FIG. 7, the initializing light $LT_I$ is converged by the objective lens OL and irradiated on the first optical recording layer 16 to sweep allover the first optical recording layer 16, so that the first optical recording layer 16 is initialized.

Here, to initialize the first optical recording layer 16, for example, a laser having a wavelength of less than 400 nm is used as the initializing light $LT_I$.

From the above, the optical disk configured as shown in FIG. 1 can be produced.

Note that the above production method is one embodiment, and other methods can be used for the production, such as a method of forming an interlayer 17 having uneven shapes for the first optical recording layer on its surface on the second optical recording layer 12, forming the first optical recording layer 16 thereon and forming a light transmitting protective film 18 thereon. Note that in any case, initialization of the first optical recording layer 16 is performed after stacking with the second optical recording layer 12 via the interlayer 17 as explained above.

Figure 8:
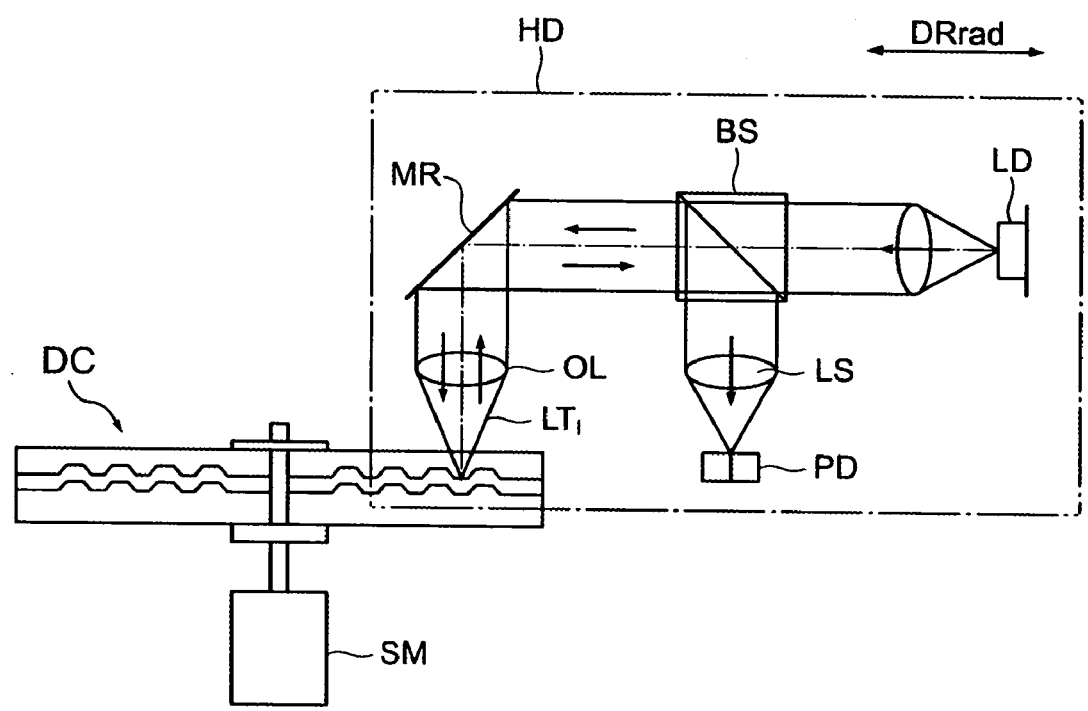
FIG. 8 is a schematic view of the configuration of an initialization apparatus used in the embodiment.

A schematic view of an example of an initialization apparatus used for initializing the above first optical recording layer 16 is shown in FIG. 8. The apparatus is not limited to the first optical recording layer 16 and can be used in the initialization step of the second optical recording layer 12 shown in FIG. 3B.

The optical disk DC having multilayers of optical recording layers of the first optical recording layer 16 and the second optical recording layer 12 is driven to rotate by a spindle motor SM. The initializing light $LT_I$ is irradiated from an optical head HD movable in the radius direction $DR_{rad}$ of the optical disk with respect to the rotated optical disk DC. A wavelength of the initializing light $LT_I$ is less than 400 nm.

The optical head HD is provided with a laser diode LD as a light source of the initializing light, a beam splitter BS, a reflection mirror MR and an objective lens OL, and configured that a return light from the optical disk DC is introduced to a photo detector PD by the beam splitter BS and a light convergence lens LS and monitored.

Figure 9:
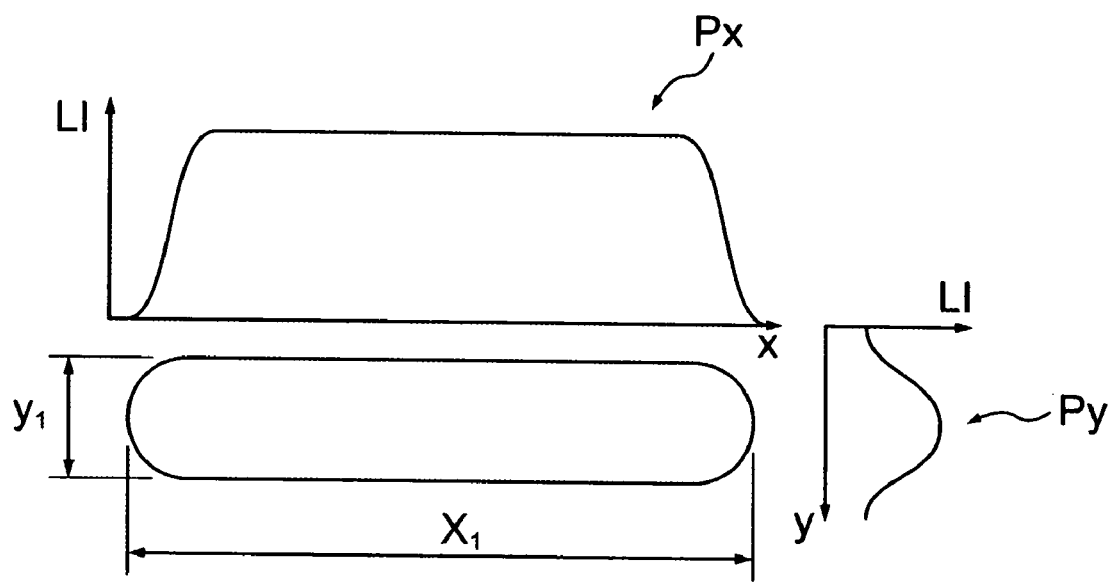
FIG. 9 is a schematic view of a spot shape and a light intensity profile of an initializing light used in the embodiment.

A spot shape and light intensity (L1) profile of the initializing light $LT_I$ converged on the first optical recording layer 16 of the optical disk DC by the initialization apparatus is shown in FIG. 9.

The initialization light $LT_I$ has an oval spot shape having a profile $P_x$ of a width $x_1$ in the radius direction x of the disk and a profile $P_y$ of a width $y_1$ in the track direction y. For example, the width $x_1$ is made to be 50 μm or so as a half width and the width $y_I$ is made to be 1 μm or so as a half width.

Next, an initialization method of an optical disk having multilayers of optical recording layers by the above initialization apparatus will be explained.

An optical disk is rotated by a suitable rotation rate by a rotation table, etc. driven by the spindle motor, and a laser convergence light as an initializing light is focused so that the focal position comes on a recording layer surface position to be initialized by using a technique called focus servo.

The laser convergence light moves by a certain distance of, for example, 5 μm in the radius direction per one rotation of the optical disk.

Due to the movement, the overall information recording/reproducing region RA of the optical disk is initialized.

Figure 10:
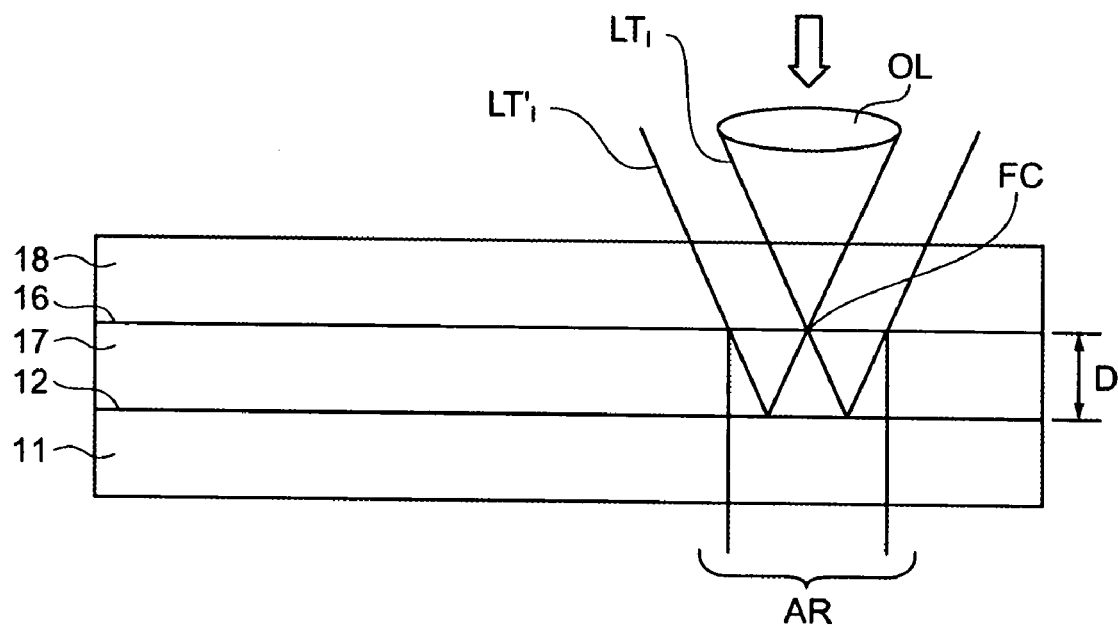
FIG. 10 is a schematic view of an arrangement of the initializing light when initializing a first optical recording layer of the optical disk according to the embodiment.

FIG. 10 shows an arrangement of the initializing light in the case of initializing the first optical recording layer 16 of the optical disk having multilayers (two layers) of optical recording layers. Note that illustration of guide grooves normally existing on the respective recording layers are omitted in FIG. 10.

A part of an incident light $LT_I$ of the initializing light focused (FC) on the first optical recording layer 16 by the objective lens OL transmits through the first optical recording layer 16 and the interlayer 17, reflects on the second optical recording layer 12, again transmits through the interlayer 17, and irradiated as a return light $LT_I'$ on the first optical recording layer 16. A first optical recording layer irradiation region AR of the reflection light on the second optical recording layer is shown in FIG. 10.

In this case, the incident light $LT_I$ of the initializing light converged on the first optical recording layer 16 and the return light $LT_I'$ from the second optical recording layer 3 cause light interfere on the first optical recording layer 16. When the light interference occurs, the laser light intensity on the first optical recording layer 16 changes from the case where there is not a return light from the second optical recording layer 12.

The change of the laser light intensity on the first optical recording layer 16 due to the light interference is cyclic with respect to changes of a thickness D of the interlayer 17. When assuming that the refraction of the interlayer 17 with respect to the wavelength $\lambda_I$ of the initializing light is $n_I$, intensity change of the laser light on the first optical recording layer 16 is generated at a cycle of $\lambda_I/(2n_I)$ in accordance with an increase amount of the thickness D of the interlayer 17.

In the case of an initialization light $\lambda_I$ of 800 nm widely used in the related art, when using the refraction $n_I=1.5$ of the interlayer 17, light intensity on the first optical recording layer 16 repeats to be strong and weak every time the thickness D of the interlayer 17 changes by 0.27 μm. For example, when the thickness D of the interlayer 17 is 20 μm, an error of the thickness of the interlayer 17 has to be controlled by 0.01 μm or less, however, it is realistically impossible and the disk surface actually has a film thickness error of 1 μm or more. Therefore, the degree of interference on the disk surface cannot be maintained to be constant.

On the other hand, as will be explained in an example below, the wavelength $\lambda_I$ of the initializing light is less than 400 nm in the present embodiment, and as a result of using as a dielectric layer in the first optical recording layer a material which has a sufficient light absorption property to the light in this region and is sufficiently transparent to an information recording/reproducing light used generally in a visible light intensity region, the formula below (1) can be satisfied.

$$ID2/ID1 \leq 0.002 \tag{1}$$

As the result, when assuming the intensity in the case of mutually intensifying as a result of interference of the converged light and the returned light is $I_{max}$ and the intensity in the case of mutually weakening is $I_{min}$, the intensity change degree becomes $I_{max}/I_{min} \leq 1.2$, so that initialization unevenness of the first optical recording layer can be reduced.

EXAMPLE

In the present example, results estimated on conditions required to suppress initialization unevenness will be explained.

First, conditions required to suppress initialization unevenness is estimated.

Figure 11:
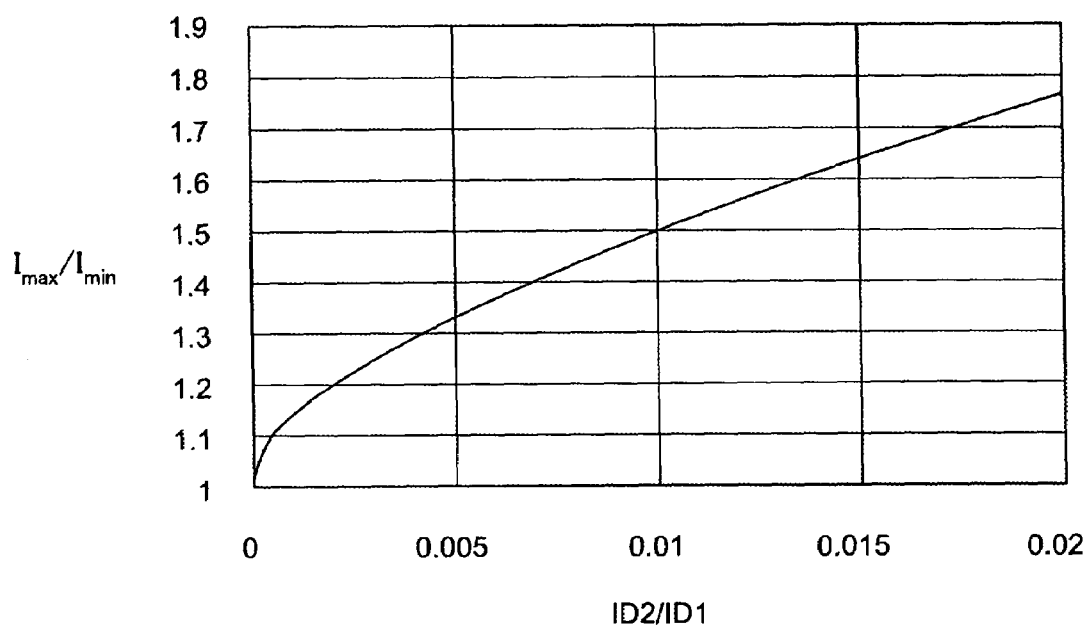
FIG. 11 is a view of the result of estimating a ratio of the energy density ID1 of an incident light to the first optical recording layer and the energy density ID2 of a return light from the second optical recording layer.

At the time of initializing the first optical recording layer, regarding the energy density ID1 per unit area of an incident light of the initializing light at respective points in the light convergence region converged on the first optical recording layer 16 and the energy density ID2 per unit area at the respective points in the above light convergence region of the return light transmitted through the first optical recording layer 16 to reach the second optical recording layer 12, reflected on the second optical recording layer 12 and again returned back to the first optical recording layer 16, relationship of the ratio of the energy densities of the incident light and the return light and a light intensity change caused by interlayer interference is shown in FIG. 11.

In FIG. 11, the abscissa axis indicates a value of ID2/ID1. Also, the ordinate indicates $I_{max}/I_{min}$, wherein $I_{max}$ is intensity in the case of intensifying to each other as a result of the interference between the converged light and the return light, and $I_{min}$ is intensity in the case of weakening to each other.

The intensity change degree is preferably $I_{max}/I_{min} \leq 1.2$ or so, the reason of which will be explained later on. It is known from FIG. 11 that it is sufficient to satisfy the formula (1) below to satisfy the above.

$$ID2/ID1 \leq 0.002 \quad (1)$$

Next, an explanation will be made on results of estimating the intensity change degree of the initializing light on the first optical recording layer 16 generated by light interference in the case of initializing an optical disk having multilayers of optical recording layers, wherein a thickness and refraction index of the interlayer 17 are 20 μm and 1.5 respectively, by using an initialization apparatus having the specific configuration that a wavelength of the initializing laser light is 300 nm, the numerical aperture of the objective lens is 0.35, the half width in the radius direction of the spot shape of the initializing laser light at a focal position is 50 μm, and the half width thereof in the track direction is 0.7 μm.

Here, the wavelength of the initializing light is 300 nm and this wavelength is used hereinafter.

Figure 12:
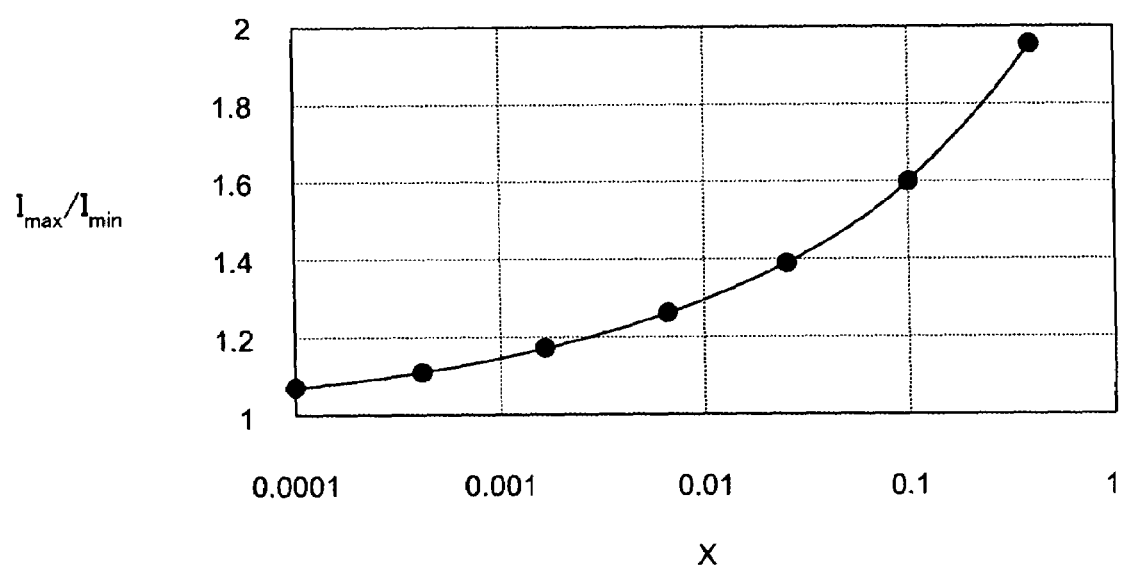
FIG. 12 is a view of the result of estimating intensity change degree of the initializing light in the embodiment.

Results estimated for the intensity change degree of the initializing light above is shown in FIG. 12.

In FIG. 12, the abscissa X indicates a value expressed by the formula (2) blow, wherein the transmittance of the first optical recording layer 16 is $T_{16}$, transmittance of the interlayer 17 is $T_{17}$ (=1−absorbance $A_{17}$ of interlayer), and the reflectance of the second optical recording layer 12 is $R_{12}$.

$$X = T_{16}^2 \times T_{17}^2 \times R_{12} \quad (2)$$

The ordinate indicates the intensity change degree of the initializing light on the first optical recording layer 16 and is a value expressed by $I_{max}/I_{min}$, wherein $I_{max}$ is intensity in the case of intensifying to each other as a result of the interference and $I_{min}$ is intensity in the case of weakening to each other.

On the other hand, for example, power of the initializing light among conditions in the initialization step affects signal characteristics in a phase change type disk.

Figure 13:
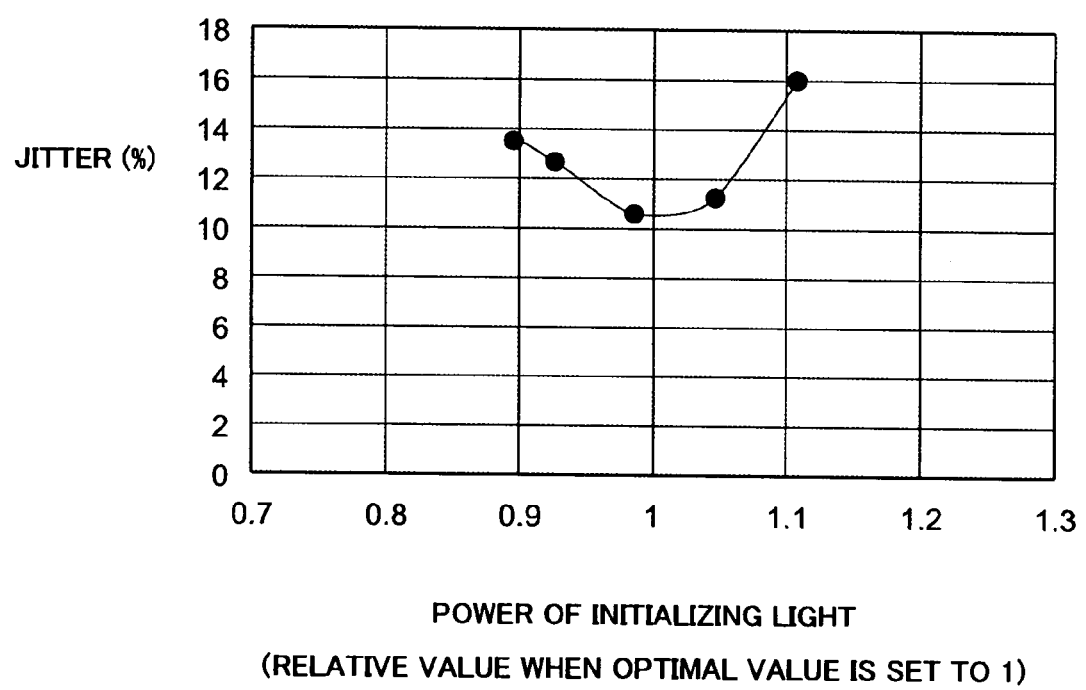
FIG. 13 is a view of dependency of signal characteristics (jitter) on power of the initializing light.

FIG. 13 shows dependency of signal characteristics on the power of the initializing light. In FIG. 13, the abscissa indicates a relative value when an optimal value of the power of the initializing light is assumed to be 1, and the ordinate indicates a jitter value after rewriting for 1000 times with power of the respective initializing lights. The smaller the jitter value is, the better.

It is judged from FIG. 13 that as the initialization power becomes higher or lower than the optimal value, the jitter ends up in increasing by small number of rewriting times, so that the range of the optimal value ±10% is the allowable range for the power of the initializing light in order to suppress the jitter as low as less than 10 and several % or so.

When the allowable range of the initialization light power is the optimal value ±10%, it roughly corresponds to ID2/ID1≦1.2 or so when converted. A conclusion can be obtained that it is preferable that the "X" expressed in the formula (2) satisfies X≦0.003 to satisfy this condition. When X=0.003, ID2/ID1 becomes approximately 0.002.

Figure 14A:
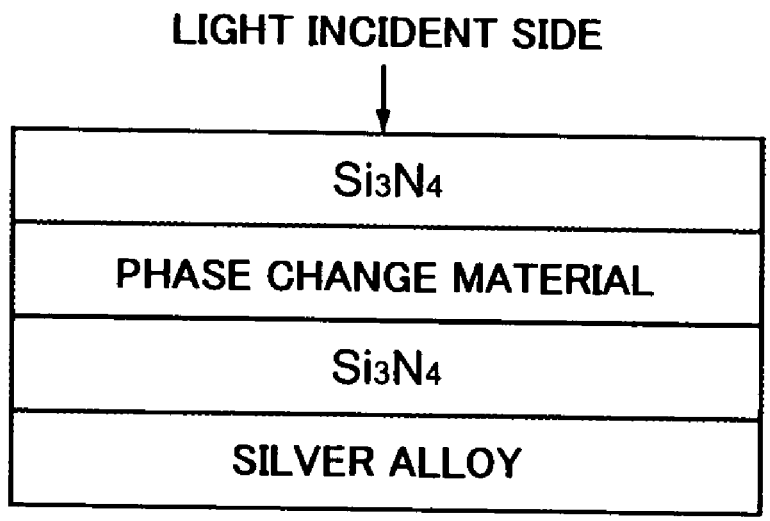
FIG. 14A and FIG. 14B are views of the layer configuration of the first optical recording layer assumed in the embodiment.
Figure 14B:
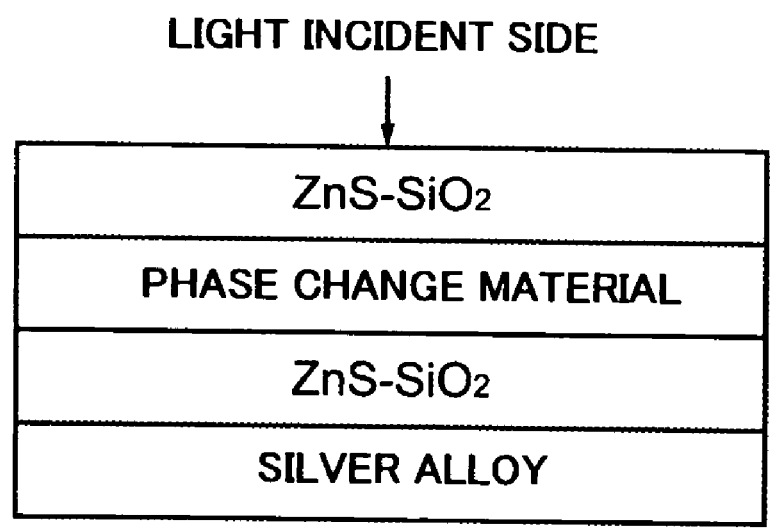
Figure 15:
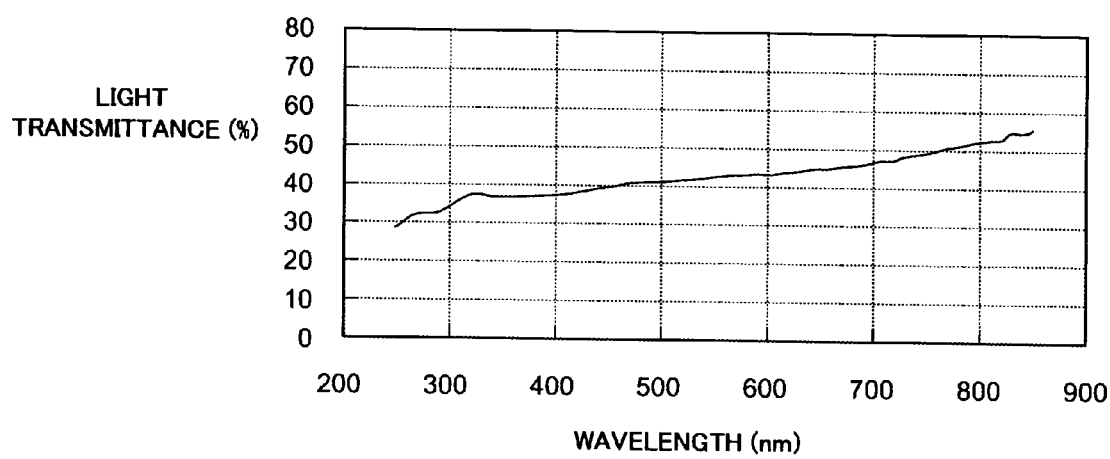
FIG. 15 is a view of light transmittance of the first optical recording layer shown in FIG. 14A.
Figure 16:
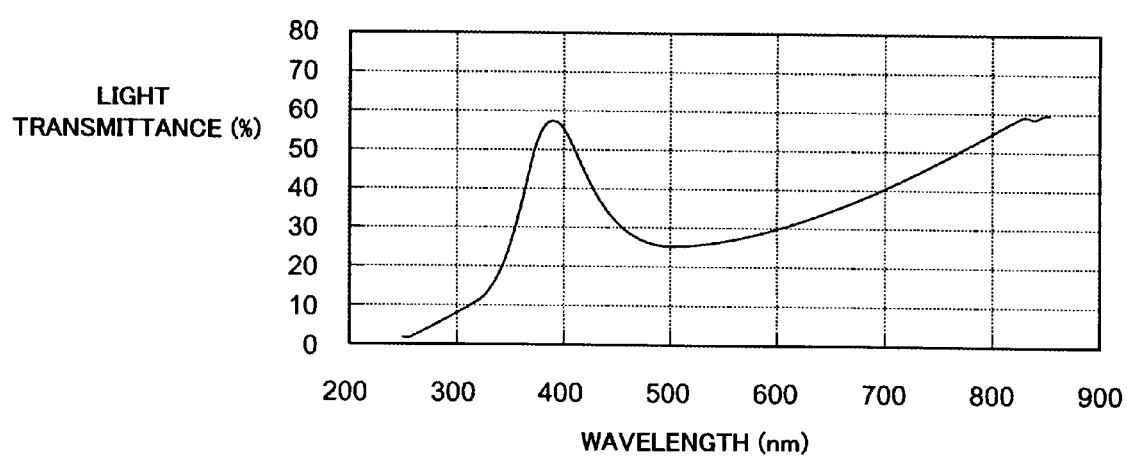
FIG. 16 is light transmittance of the first optical recording layer configured as shown in FIG. 14B.

Next, as an example of the first optical recording layer, on an assumption of the layer configuration shown in FIG. 14A and FIG. 14B, the respective light transmittances thereof are shown in FIG. 15 and FIG. 16.

The first optical recording layer shown in FIG. 14A and FIG. 14B is designed for the case that the wavelength of the recording/reproducing light is 400 nm and has a suitable light transmittance to the wavelength of 400 nm. Note that initialization in the state without a light transmitting protective film normally provided on the light incident side is assumed here, so that the transmittance is different from that in the case with a light transmitting protective film.

A different point in the configuration of the respective first optical recording layers in FIG. 14A and FIG. 14B is that $Si_3N_4$ is used in FIG. 14A and ZnS—$SiO_2$ is used in FIG. 14B as a material of a dielectric layer which is transparent at the wavelength of 400 nm, and a recording film of a phase change type recording material and a reflection film of a silver alloy have the same configurations.

The light transmittance of the first optical recording layer in the case of FIG. 14A is shown in FIG. 15.

According to this, a change of the light transmittance is not observed at the wavelength of 250 nm or more.

This is because the $Si_3N_4$ does not exhibit much absorption property in the above wavelength range and absorption property of other materials is not changed much by a wavelength.

On the other hand, the light transmittance of the first optical recording layer in the case of FIG. 14B is shown in FIG. 16.

A high absorption property is exhibited at the wavelength of 350 nm or less and the light transmittance is abruptly decreased. The reason the light transmittance abruptly decreases lays in the light absorption property of ZnS—$SiO_2$.

Figure 17:
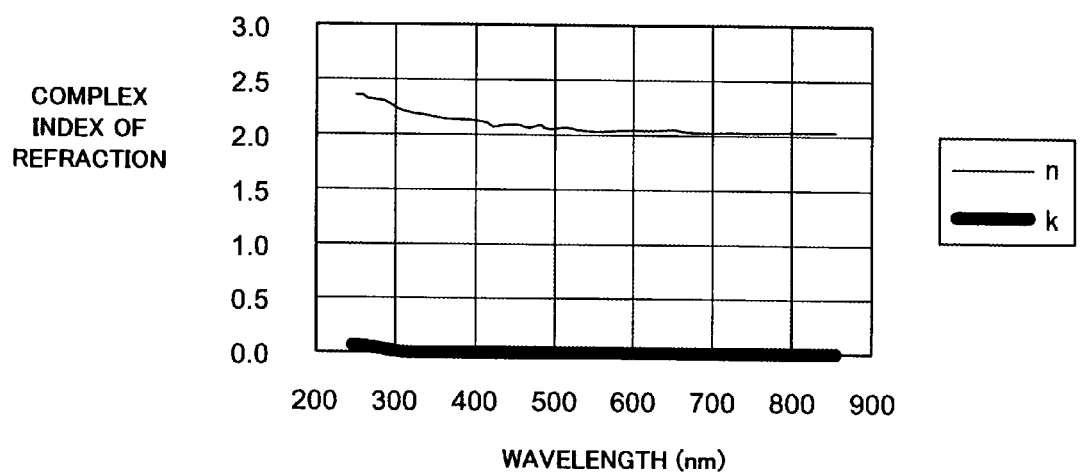
FIG. 17 is a view of dependency on a wavelength of a complex index of refraction ("n" is refraction index and "k" is extinction coefficient) of $Si_3N_4$.

FIG. 17 shows dependency on the wavelength of a complex index of refraction ("n" is refraction index and "k" is extinction coefficient) of $Si_3N_4$.

As shown in FIG. 17, the "k" value of $Si_3N_4$ is approximately zero at the wavelength of 250 nm or more, indicating absorption property is not exhibited in that wavelength range.

Figure 18:
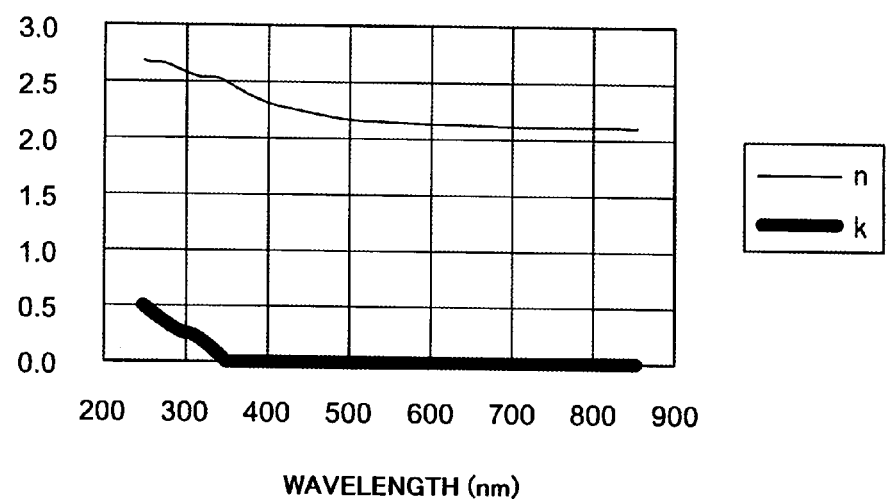
FIG. 18 is a is a view of dependency on a wavelength of a complex index of refraction ("n" is refraction index and "k" is extinction coefficient) of ZnS—$SiO_2$.

FIG. 18 shows dependency on the wavelength of a complex index of refraction ("n" is refraction index and "k" is extinction coefficient) of ZnS—$SiO_2$.

As is known from FIG. 18, the value of the extinction coefficient "k" is increased at the wavelength of 350 nm or less.

Here, the light transmittance at the wavelength of 300 nm of the optical recording layer shown in FIG. 14B using ZnS—$SiO_2$ as a dielectric film is as small as 8% and the reflectance of the second optical recording layer is estimated to be 50% or so at most. Consequently, when calculating "X" by following the above formula (2), X=0.003 satisfying the condition of X≦0.003 required to satisfy $I_{max}/I_{min} \leq 1.2$ or so.

On the other hand, in the case of the optical recording layer shown in FIG. 14A using $Si_3N_4$ as a dielectric film, the high light transmittance is exhibited at the wavelength up to 250 nm or so in the first optical recording layer, so that it turned out that other countermeasure is also required to satisfy the condition of X≦0.003.

From the above, by using a laser light in an ultraviolet region of less than 400 nm and using as a dielectric film in the first optical recording layer a material having sufficient light absorption property to the light in that region and being sufficiently transparent to an information recording/reproducing light generally used in the visible light intensity range, initialization unevenness of the first optical recording layer can be reduced.

Note that dielectric being transparent in the visible light range and exhibiting absorption property in the ultraviolet ray range is not limited to ZnS—$SiO_2$, and a material called ITO (indium tin oxide) or other material can be selected by considering combination with a laser wavelength to be used.

Figure 19:
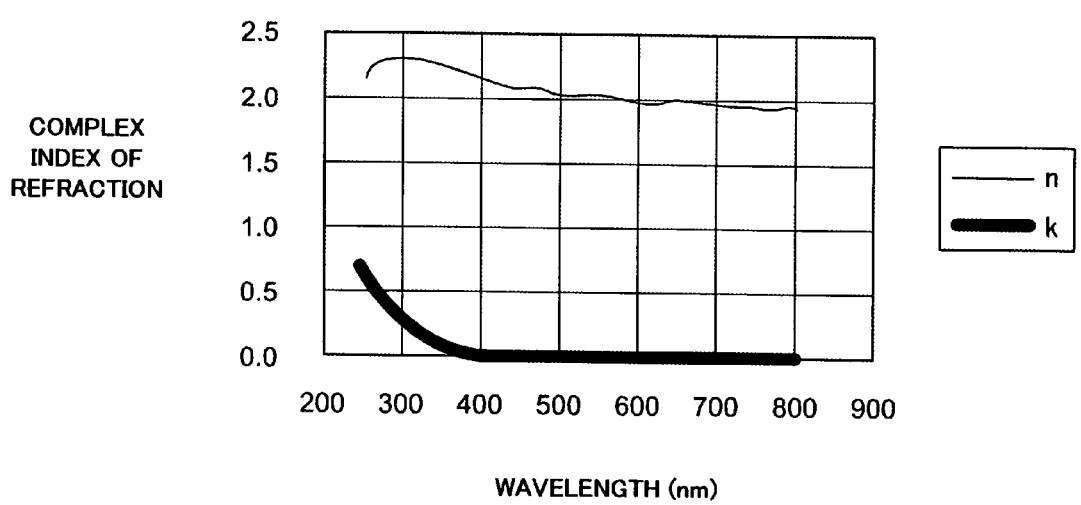
FIG. 19 is a view of dependency on a wavelength of a complex index of refraction ("n" is refraction index and "k" is extinction coefficient) of ITO.

FIG. 19 shows dependency on the wavelength of a complex index of refraction ("n" is refraction index and "k" is extinction coefficient) of ITO.

In ITO, in the same way as in ZnS—$SiO_2$, a value of the extinction coefficient "k" starts to increase at the wavelength of around 400 nm and becomes a larger value than that in ZnS—$SiO_2$ in the short wavelength range around 250 nm.

Accordingly, even in the case of using ITO as the dielectric film, the condition of X≦0.003 required to satisfy $I_{max}/I_{min}$≦1.2 or so can be satisfied by suitably selecting the wavelength of the initializing light.

From the present embodiment, at the time of initializing a multilayer optical disk having two or more layers of optical recording layers of the rewritable type or the write-once type among phase change type optical disks, by using as the dielectric film composing the first optical recording layer a layer of a material, which is sufficiently transparent to the laser light for information recording/reproducing and exhibits absorption property to the laser light used for initializing, light intensity change on the initializing surface caused by light interference between optical recording layers is reduced, so that preferable initialization can be performed.

Particularly, by setting the initialization wavelength to be 400 nm or less, a material being sufficiently transparent to the laser light used for information recording/reproducing and exhibiting absorption property in the initialization wavelength can be easily used as a film composing the first optical recording layer and the above initialization unevenness can be reduced.

The present invention is not limited to the above embodiments.

For example, the disk configuration to be initialized is not limited to the configuration shown in FIG. 1, and initialization may be performed in the state where there is not the light transmitting protective film 18 formed on the first optical recording layer 16 in the configuration in FIG. 1.

Other than the above, a variety of modifications may be made within the scope of the present invention.

According to the present invention, at the time of initializing an optical recording medium having a phase change type optical recording layer, information recording/reproducing signal characteristics of respective recording layers is not deteriorated and initialization unevenness due to light interference caused at the time of initialization can be reduced.

INDUSTRIAL APPLICABILITY

The present invention is able to be used in an initialization method of an optical disk used in a production method of an optical disk capable of dealing with memory forms of rewritable type, etc. having an optical recording layer using a phase change type material as a recording material, and enabling to realize an inexpensive large-capacity file.

The invention claimed is:

1. An initialization method of an optical recording medium, wherein a second optical recording layer and a first optical recording layer are stacked via an interlayer on a substrate in an order, a protective layer is formed further on said first optical recording layer, a recording film in said first optical recording layer comprises a phase change type recording material, and a recording/reproducing light is irradiated from said protective film side at the time of recording/reproducing, wherein:

in a step of initializing by irradiating an initializing light on said first optical recording layer from said protective film side, said first optical recording layer is initialized so that an energy density ID1 per unit area of an incident light of said initializing light at respective points in a light convergence region on the first optical recording layer and an energy density ID2 per unit area at the respective points of said light convergence region of a return light, which is said initializing light transmitted through said first optical recording layer to reach said second optical recording layer, reflected on the second optical recording layer and again returned to said first optical recording layer, satisfy a formula (1) below.

$$ID2/ID1 \leq 0.002 \tag{1}$$

2. An initialization method of an optical recording medium as set forth in claim 1, wherein:

a wavelength of said initializing light is a wavelength different from a wavelength of said recording/reproducing light; and said first optical recording layer includes a film being transparent to said recording/reproducing light and exhibiting absorption property to said initializing light.

3. An initialization method of an optical recording medium as set forth in claim 2, wherein:

a wavelength of said initializing light is less than 400 nm; and a film being transparent to said recording/reproducing light and exhibiting absorption property to said initializing light contains ZnS—$SiO_2$.

4. An initialization method of an optical recording medium as set forth in claim 2, wherein:

a wavelength of said initializing light is less than 400 nm; and a film being transparent to said recording/reproducing light and exhibiting absorption property to said initialization light contains ITO.

* * * * *